US012198670B2

(12) United States Patent
Ohta et al.

(10) Patent No.: US 12,198,670 B2
(45) Date of Patent: Jan. 14, 2025

(54) FILTERING DEVICE, CONTROL SYSTEM, AND FILTERING METHOD

(71) Applicant: NEC Corporation, Tokyo (JP)

(72) Inventors: Daisuke Ohta, Tokyo (JP); Hiroshi Yoshida, Tokyo (JP); Tatsuya Yoshimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 17/910,572

(22) PCT Filed: Mar. 30, 2020

(86) PCT No.: PCT/JP2020/014598
§ 371 (c)(1),
(2) Date: Sep. 9, 2022

(87) PCT Pub. No.: WO2021/199169
PCT Pub. Date: Oct. 7, 2021

(65) Prior Publication Data
US 2023/0132577 A1    May 4, 2023

(51) Int. Cl.
*G10K 11/178*    (2006.01)
(52) U.S. Cl.
CPC .. *G10K 11/17854* (2018.01); *G10K 11/17883* (2018.01)

(58) Field of Classification Search
CPC .......... G10K 11/178; G10K 11/17853; G10K 11/17854; G10K 11/17883; G10K 2210/3028
See application file for complete search history.

(56) References Cited

U.S. PATENT DOCUMENTS 8,521,530 B1 *   8/2013  Every ..................... H04M 9/08
                                                        704/251
11,922,918 B2 *  3/2024  Pignier Delafontaine ..................
                                                   G10K 11/17854

FOREIGN PATENT DOCUMENTS

| JP | 2672143    | B2 | 11/1997 |
| JP | 2002-180504 | A  | 6/2002  |
| JP | 2007-041508 | A  | 2/2007  |
| JP | 2008-164514 | A  | 7/2008  |

OTHER PUBLICATIONS

International Search Report for PCT Application No. PCT/JP2020/014598, mailed on Jun. 16, 2020.

* cited by examiner

*Primary Examiner* — Kile O Blair

(57) ABSTRACT

A filtering device is configured to estimate the characteristics of noise superposed on measurement data relating to the status of a controlled machine based on the status information representing the status of a controlled machine, thus adjusting the filtering to eliminate noise based on the estimated noise characteristics.

18 Claims, 6 Drawing Sheets

FILTERING DEVICE, CONTROL SYSTEM, AND FILTERING METHOD

This application is a National Stage Entry of PCT/JP2020/014598 filed on Mar. 30, 2020, the contents of all of which are incorporated herein by reference, in their entirety.

TECHNICAL FIELD

The present invention relates to a filtering device, a control system, and a filtering method.

BACKGROUND ART

Control devices configured to control machinery serving as controlled objects such as robots and construction machines are designed to acquire measurement data including numerical values representative of statuses of controlled machines from sensors configured to produce information about statuses of controlled machines so as to achieve control over controlled machines based on measurement data. As the information about statues of controlled machines, for example, sensors may output various types of measurement data, such as angles from reference positions of predetermined parts, speeds to drive predetermined parts, and forces applied to predetermined parts, to control devices. Control devices are designed to perform feedback control based on measurement data so as to achieve control over controlled machines. In this connection, control devices should inevitably acquire plenty of measurement data superposed with noise. To realize highly-accurate control over controlled machines, control devices need to precisely eliminate noises superposed on measurement data. Patent Document 1 and Patent Document 2 disclose technologies relating to noise elimination.

Patent Document 1 discloses techniques as to how to detect the position of a bucket of a backhoe machine relative to its drive part based on detection values of sensors configured to detect angles of various parts of a backhoe machine and how to prevent interference between the bucket and the drive part based on the detected position information. Patent Document 2 discloses techniques as to how to produce an attitude angle according to angular speed and acceleration detected by a measurement device attached to a working machine and how to reduce noise included in the attitude angle.

CITATION LIST

Patent Literature Document

Patent Document 1: Japanese Patent No. 2672143
Patent Document 2: Japanese Patent Application Publication No. 2002-180504

SUMMARY OF INVENTION

Technical Problem

The aforementioned noise superposed on measurement data may be varied according to an attitude status and a drive status of a controlled machine serving as a controlled object. For example, it is assumed that the controlled machine would be a hydraulic excavator using an incline sensor configured to measure an angle and an incline of an object according to gravity as a sensor configured to measure information relating to the status of a controlled machine. In this case, an amount of motion acceleration other than gravity should be differentiated between a halting mode and an operating mode of a hydraulic excavator, which may differentiate characteristics of noise superposed on measurement data produced by an incline sensor. To achieve highly-accurate control over a controlled machine, it is necessary to appropriately eliminate noise (e.g., noise superposed on measurement data) according to an attitude status and a drive status of the controlled machine.

Accordingly, the present invention aims to provide a filtering device, a control system, and a filtering method which can solve the aforementioned problem

Solution to Problem

In a first aspect of the present invention, a filtering device is characterized by including a noise-characteristic estimation means configured to estimate the characteristics of noise superposed on measurement data relating to the status of a controlled machine based on the status information representing the status of the controlled machine, and a filtering adjustment means configured to adjust the filtering to eliminate noise based on the estimated noise characteristics.

In a second aspect of the present invention, a control system is characterized by including a sensor configured to acquire measurement data relating to the status of a controlled machine, a noise-characteristic estimation means configured to estimate the characteristics of noise superposed on measurement data based on the status information representing the status of the controlled machine, and a filtering adjustment means configured to adjust the filtering to eliminate noise based on the estimated noise characteristics.

In a third aspect of the present invention, a filtering method is characterized by estimating the characteristics of noise superposed on measurement data relating to the status of a controlled machine based on the status information representing the status of the controlled machine, and adjusting the filtering to eliminate noise based on the estimated noise characteristics.

Advantageous Effects of Invention

According to the present invention, it is possible to eliminate noise (e.g., noise superposed on measurement data) to be varied according to an attitude status and a drive status of a controlled machine with high accuracy.

EXEMPLARY EMBODIMENTS TO CARRY OUT THE INVENTION

Hereinafter, a control system equipped with a filtering device according to one exemplary embodiment of the present invention will be described with reference to the accompanying drawings.

Figure 1:
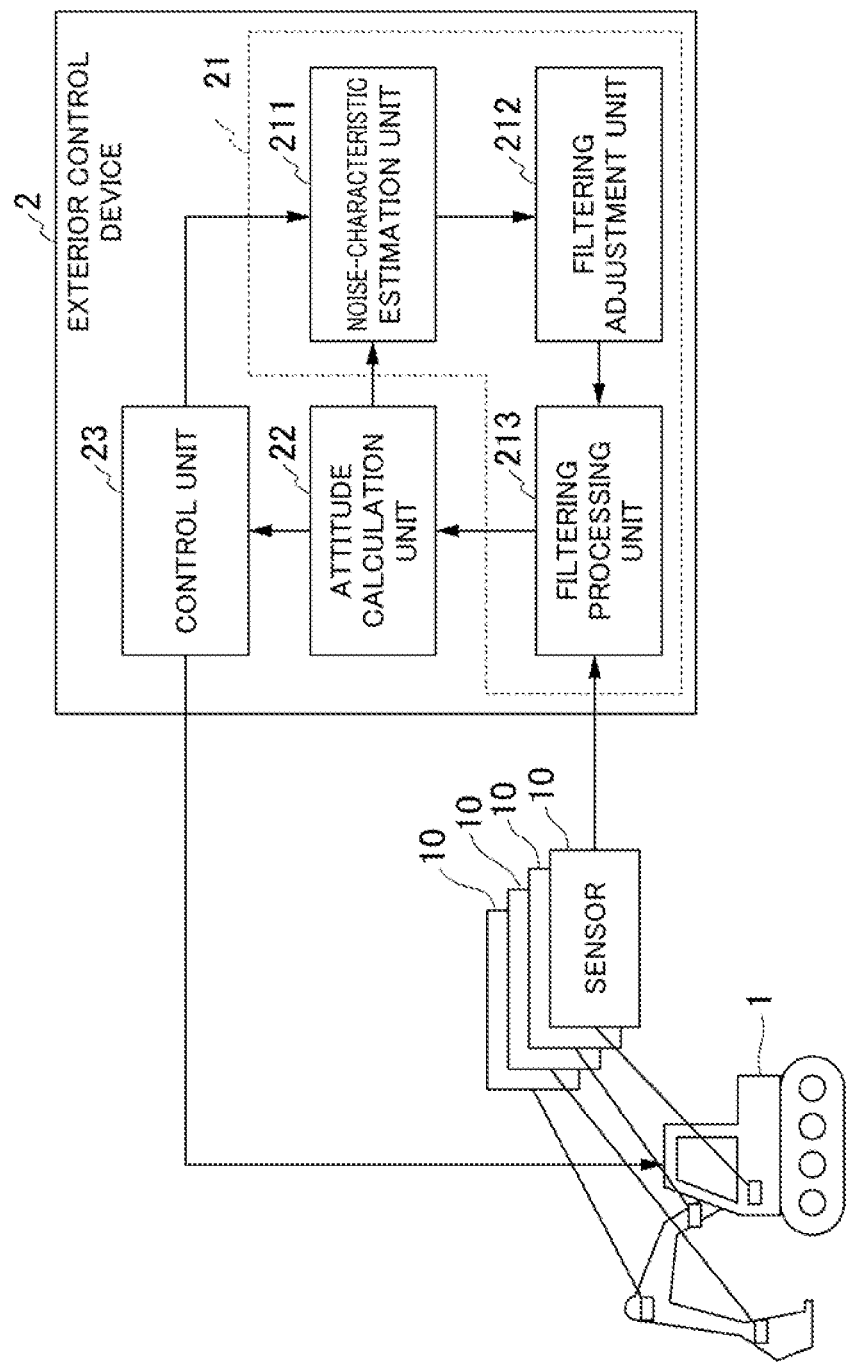
FIG. 1 is a block diagram showing the configuration of a control system according to one exemplary embodiment of the present invention.

FIG. 1 is a block diagram showing the configuration of a control system according to one exemplary embodiment. A control system 100 includes at least a construction machine 1 serving as an example of a controlled machine, one or multiple sensors 10 configured to measure the status information of the construction machine 1, and an exterior control device 2. In the present exemplary embodiment, the construction machine 1 is a hydraulic excavator.

For example, the sensor(s) 10 is an incline sensor configured to detect an incline value for each part to be driven in the construction machine 1 as the status information of the construction machine 1, thus outputting sensing information including the inline value. The sensors 10 are each attached to each driven part so as to detect an incline for each driven part. In the case of a hydraulic excavator serving as the construction machine 1, for example, driven parts may be each defined as an arm, a boom, or a bucket. In this connection, the sensors 10 may be each configured to detect a physical state of the construction machine 1 other than an incline for each driven part. In the case of a hydraulic excavator serving as the construction machine 1, for example, the sensor 10 may detect a revolving angle of an upper-revolving structure relative to a lower-traveling structure. In this case, the sensor 1 may be a gyro-sensor or a linear-encoder. Hence, the sensor 10 may output the sensing information representing a revolving angle. Alternatively, the sensor 10 may detect an amount of oil flown into each driven part of the construction machine 1. In the case of a hydraulic excavator serving as the construction machine 1, for example, the sensor 10 may measure an amount of oil flown into a hydraulic cylinder for each driven part. In this case, the sensor 10 may output the sensing information representing an amount of oil flown into a hydraulic cylinder for each driven part of the construction machine 1. Alternatively, the sensor 10 may measure an operating distance for each driven part of the construction machine 1. In the case of a hydraulic excavator serving as the construction machine 1, for example, the sensor 10 may measure the length of a rod protruded from a hydraulic cylinder for each driven part. In this case, the sensor 10 may be a stroke sensor. In addition, the sensor 10 may output the sensing information representing the operating distance for each driven part. The sensing information may be one example of feedback information. The exterior control device 2 is a device configured to control an exterior operation of the construction machine 1 from a remote place.

Figure 2:
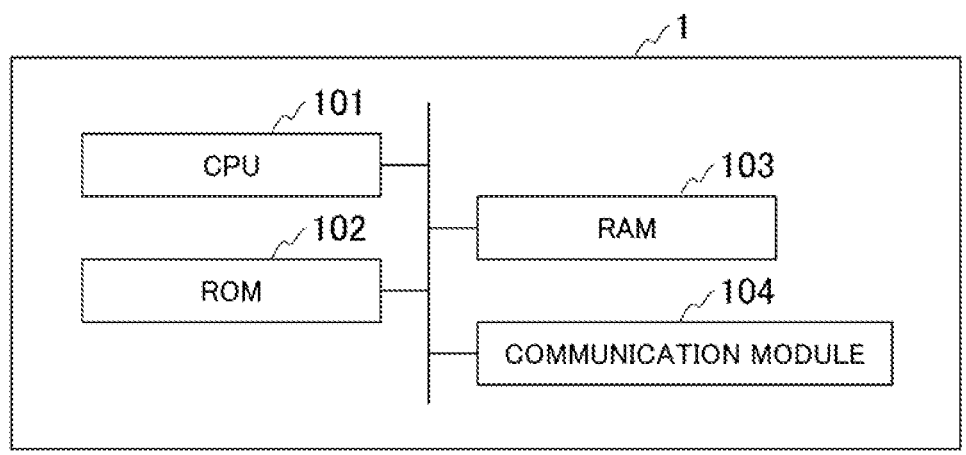
FIG. 2 is a block diagram showing the hardware configuration of an exterior control apparatus according to one exemplary embodiment of the present invention.

FIG. 2 is a block diagram showing the hardware configuration of the exterior control device 2.

As shown in FIG. 2, the exterior control device 2 is a computer including various hardware elements such as a CPU (Central Processing Unit) 101, a ROM (Read-Only Memory) 102, a RAM (Random-Access Memory) 103, and a communication module 104. The exterior control device 2 is configured to execute control programs stored in advance. Accordingly, the exterior control device 2 achieves various functions as shown in FIG. 1 serving as a filtering device 21, an attitude calculation unit 22, and a control unit 23. In addition, the filtering device 21 achieves various functions serving as a noise-characteristic estimation unit 211, a filtering adjustment unit 212, and a filtering-processing unit 213. Any functions among the aforementioned functions may be realized by electronic circuits.

The filtering device 21 is configured to acquire measurement data from the sensors 10 so as to perform a filtering process to eliminate noise superposed on measurement data. The attitude calculation unit 22 is configured to calculate attitude information including a value of a current attitude (an attitude value) of the construction machine 1 using the measurement data subjected to the filtering process. The control unit 23 is configured to control the construction machine 1 based on the attitude information of the construction machine 1 and the drive control information including a driving direction and drive speed for each driven part such as an actuator of the construction machine 1 according to a user operation or an automatic control.

The noise-characteristic estimation unit 211 of the filtering device 21 is configured to estimate characteristics of noise superposed on measurement data acquired from the sensors 10 based on the status information representing the status of the construction machine 1. The status information indicates at least one of the attitude information and the drive control information. For example, it is possible to assume the estimated noise characteristics as an amount of noise in a predetermined time. The filtering adjustment unit 212 is configured to adjust the filtering to eliminate noise superposed on measurement data. For example, the filtering adjustment unit 212 may adjust parameters in a filtering calculation formula (e.g., a noise-filtering process). Alternatively, the filtering adjustment unit 212 may change the filtering calculation formula with another filtering calculation formula. The filtering processing unit 213 is configured to perform a filtering process of noise superposed on measurement data using the filtering calculation formula adjusted by the filtering adjustment unit 212.

The following exemplary embodiments refer to all the controlled machines as construction machines; but controlled machines should not be necessarily limited to construction machines. For example, it is possible to assume controlled machines as physical distribution/transportation machines. Specifically, it is possible to mention forklifts, stackers, cranes, automated guided vehicles (AGV), etc. Alternatively, it is possible to assume controlled machines as other industrial machines, personal robots, marine hydraulic power units, and the like. Those controlled machines may be involved in state transitions in terms of characteristics of noise superposed on measurement data. In other words, it is possible to assume any types of controlled machines, other than the aforementioned machines, which may be involved in state transitions in terms of characteristics of noise superposed on measurement data.

First Exemplary Embodiment

Figure 3:
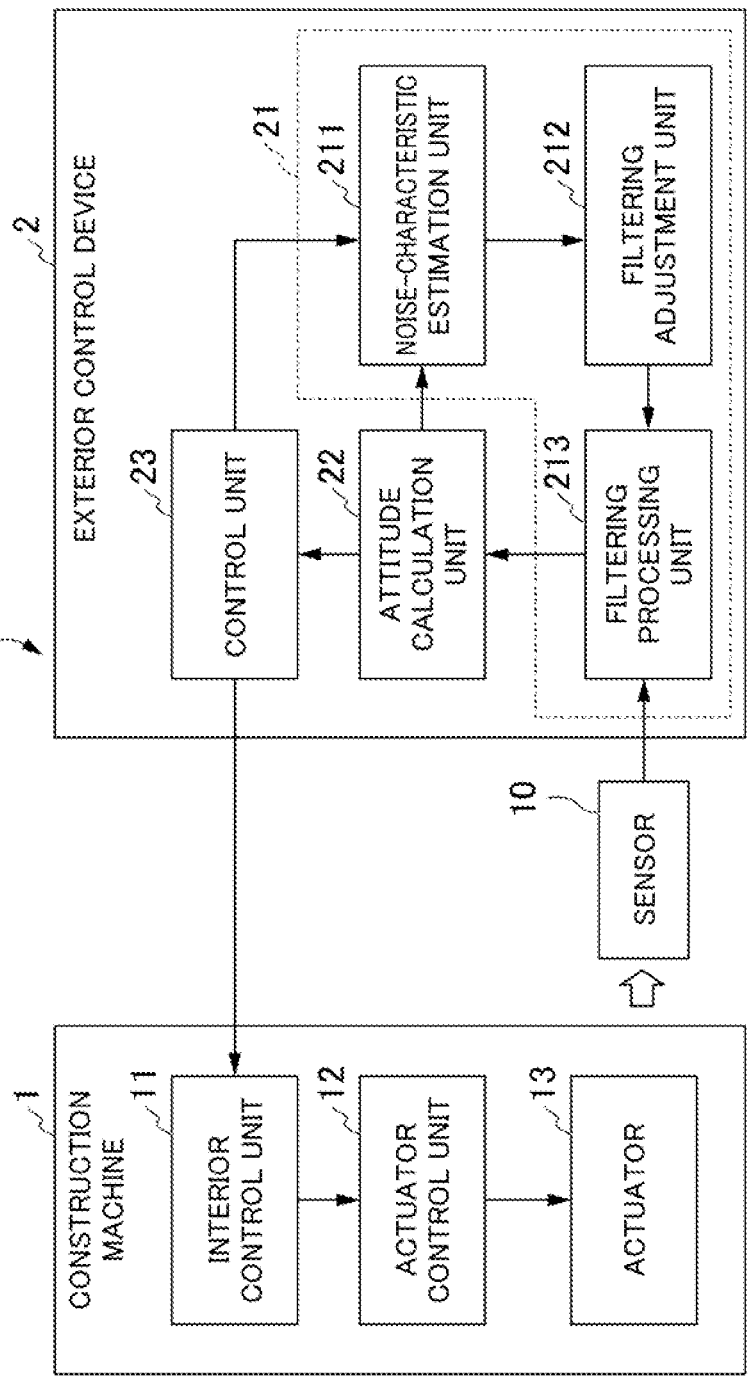
FIG. 3 is a block diagram showing the function of a control system according to the first exemplary embodiment.

FIG. 3 is a block diagram showing the functionality of the control system 100 according to the first exemplary embodiment.

The construction machine 1 includes an interior control unit 11, an actuator control unit 12, and an actuator 13. The control system 100 further includes the sensor 10 and the exterior control device 2 similar to the foregoing ones. According to the first exemplary embodiment, the control unit 23 of the exterior control device 2 outputs the drive control information directly to the interior control unit 11 included in the construction machine 1; the interior control unit 11 controls the actuator control unit 12 based on the drive control information; the actuator control unit 12 drives the actuator 13 under the control of the interior control unit 11. In the case of a hydraulic excavator serving as the construction machine 1, for example, the actuator 13 should drive a boom, an arm, a bucket, or the like. In this connection, the interior control unit 11 may control a traveling mechanism installed in the construction machine 1, a rotating mechanism for rotating a body of the construction machine 1 in a horizontal direction, or the like based on the drive control information.

Figure 4:
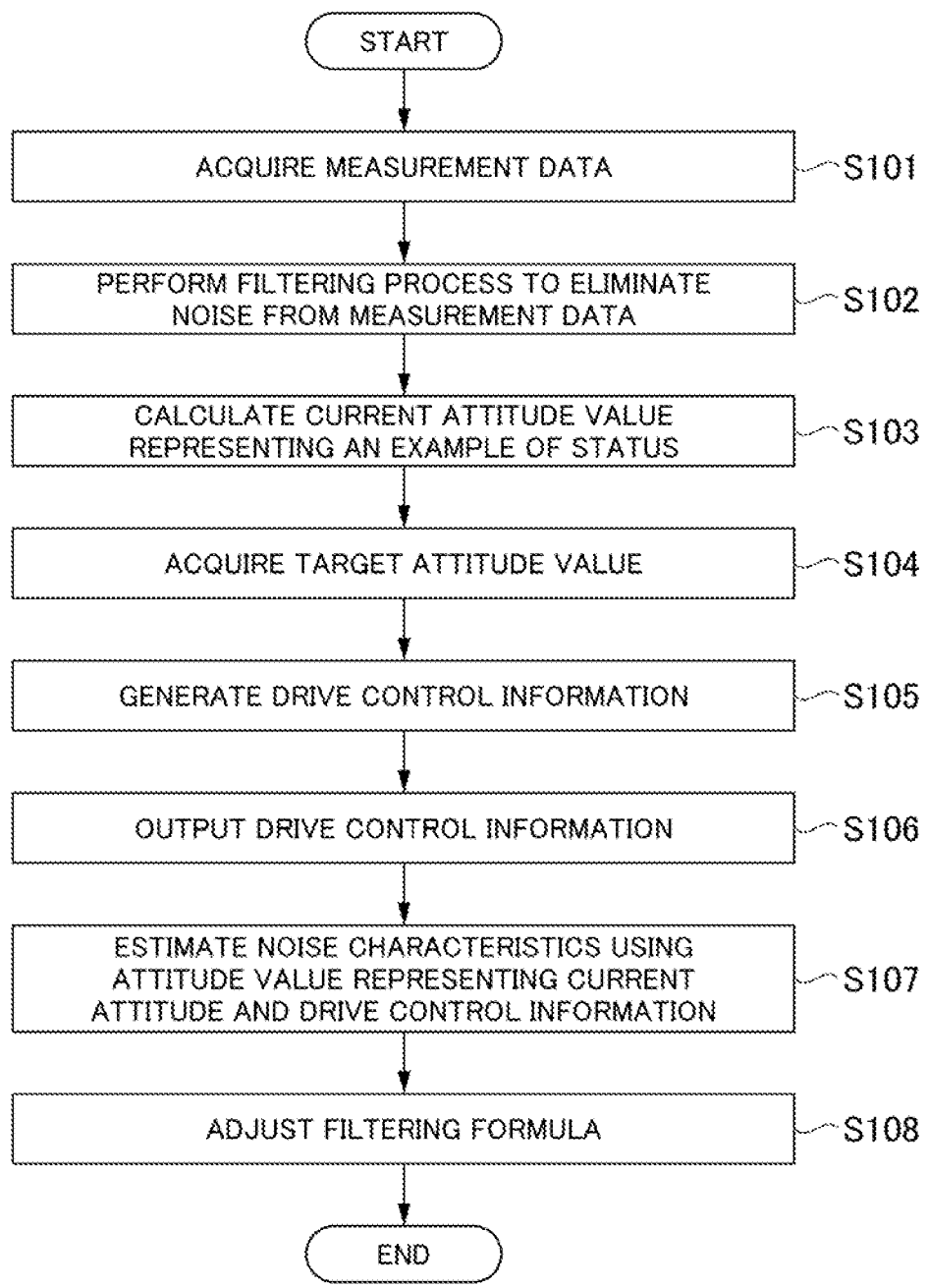
FIG. 4 is a flowchart showing the processing of an exterior control device according to the first exemplary embodiment.

FIG. 4 is a flowchart showing the processing of the exterior control device 2 according to the first exemplary embodiment.

Hereinafter, the processing of the control system 100 will be described in detail.

The sensors 10 are outputting their measurement data to the exterior control device 2 while the construction machine 1 is operating based on the drive control information output from the exterior control device 2. For example, the sensors 10 communicate with the exterior control device 2 via wired communication so as to transmit wires signals including measurement data to the exterior control device 2. In this connection, the sensors 10 may communicate with the exterior control device 2 via wireless communication so as to transmit wireless signals including measurement data to the exterior control device 2. The exterior control device 2 acquires measurement data (step S101).

The filtering processing unit 213 performs a filtering process to eliminate noise from the acquired measurement data using a filtering calculation formula adjusted by the filtering adjustment unit 212 (step S102). The attitude calculation unit 22 calculates a current attitude value, serving as an example of the current status of the construction machine 1 using the measurement data from which noise has been eliminated in the filtering process (step S103). The attitude value of the construction machine 1 represents an angle relative to the reference position for each driven part. For example, as described above, the attitude value may represent a rotation angle of a boom, an arm, or a bucket in its reference direction.

The control unit 23 acquires a current attitude value from the attitude information of the attitude calculation unit 22. In addition, the control unit 23 acquires a target attitude value which is determined according to a user operation or an automatic control (step S104). The control unit 23 generates the drive control information based on the current attitude value and the target attitude value (step S105). The drive control information may include data components representing drive speed and a driving direction for each driven part such as an actuator. In this connection, the drive control information may include a data component representing a drive type of the construction machine 1. For example, the drive type represents a type of work of the construction machine 1, or the drive type represents any types such as excavation, lifting, leveling, rotation, forward traveling, and backward traveling of the construction machine 1 serving as a hydraulic shovel. The control unit 23 generates and outputs the drive control information to the construction machine 1 (step S106).

The interior control unit 11 of the construction machine 1 acquires the drive control information. The interior control unit 11 converts the drive control information into prescribed signals which can be acknowledged by the actuator control unit 12, thus outputting prescribed signals to the actuator control unit 12. The actuator control unit 12 controls the actuator 13 based on prescribed signals output from the interior control unit 11. Thus, the construction machine 1 can operate based on the drive control information.

The attitude calculation unit 22 outputs attitude values corresponding to measurement data output from the sensors 10 to the noise-characteristic estimation 211. In addition, the control unit 23 outputs the drive control information to the construction machine 1 as well as the noise-characteristic estimation unit 211. The noise-characteristic estimation unit 211 estimates characteristics of noise superposed on measurement data using the drive control information and the attitude value representing the current attitude of the construction machine 1 (step S107).

Specifically, the exterior control device 2 stores a noise-characteristic estimation table on a storage unit installed therein. For example, the noise-characteristic estimation table is a data table configured to store noise characteristics in association with the attitude value of the construction machine 1 and the drive type of the construction machine 1. In the present exemplary embodiment, as described above, the attitude value of the construction machine 1 represents a rotation angle for each driven part in its reference direction. Herein, noise characteristics which are recorded on the noise-characteristic estimation table in association with the attitude value and the drive type might be previously measured values which have been previously measured in previous measurements, for example, wherein it is possible to record statistic values such as noise variances upon defining noise as a difference between an attitude value, which is calculated from measurement data obtained from the sensors 10 in the predetermined time, and a correct value for each attitude when the construction machine 1 is fixed to a certain attitude or when the construction machine 1 is driven to change its attitude from one attitude to another attitude. The correct value for each attitude would be an accurately-measured value for each attitude of each driven part of the construction machine 1 using a measuring instrument such as a total station. The noise-characteristic estimation unit 211 estimates characteristics of noise superposed on measurement data by selecting the current noise characteristics from the noise-characteristic estimation table according to the acquired attitude value and the drive type included in the acquired drive control information. The noise-characteristic estimation unit 211 outputs the selected noise characteristics to the filtering adjustment unit 212.

In this connection, the noise-characteristic estimation unit 211 may estimate noise characteristics by another method. For example, the noise-characteristic estimation unit 212 may estimate noise characteristics based on the attitude value of the construction machine 1 alone. In this case, for example, the noise-characteristic estimation table would be a data table configured to store noise characteristics associated with the attitude value of the construction machine 1 in advance. The noise-characteristic estimation unit 211 estimates characteristics of noise superposed on measurement data by selecting the current noise characteristics from the noise-characteristic estimation table based on the acquired attitude value.

Alternatively, the noise-characteristic estimation unit 211 may estimate noise characteristics based on the drive type of the construction machine 1 alone. In this case, for example, the noise-characteristic estimation table would be a data table configured to store noise characteristics associated with the drive type of the construction machine 1 in advance. The noise-characteristic estimation unit 211 estimates characteristics of noise superposed on measurement data by selectin the current noise characteristics from the noise-characteristic estimation table according to the drive type included in the acquired drive control information.

The aforementioned process of the noise-characteristic estimation unit 211 would be one aspect of a process to select noise characteristics associated with a value of status information according to an association between the value of the status information and noise characteristics.

The noise-characteristic estimation unit 211 may estimate noise characteristics based on the drive content for each driven part of the construction machine 1. In this case, for example, the noise-characteristic estimation table would be a data table configured to store noise characteristics for each driven part of the construction machine 1 according to its drive content in advance. The drive content represents drive speed and a driving direction for each driven part. In this connection, the drive speed may represent an amount of movement for each driven part per unit time. Herein, the noise-characteristic estimation table records previously measured values, which have been measured in previous measurements in advance, as noise characteristics according to the drive content for each driven part, for example, wherein it is possible to store statistic values as noise variances upon defining noise as a difference between an attitude value, which is calculated from measurement data obtained from the sensors 10 in the predetermined time, and a correct value for each attitude of each driven parts being driven when each driven part of the construction machine 1 is driven at certain drive speed in a certain driving direction while changing its attitude from one attitude to another attitude. The noise-characteristic estimation unit 211 estimates characteristics of noise superposed on measurement data by selecting the current noise characteristics from the noise-characteristic estimation table according to the drive content included in the acquired drive control information.

Moreover, the noise-characteristic estimation unit 211 may estimate noise characteristics according to inertia force applied to each driven part of the construction machine 1. For example, the following description refers to an incline sensor serving as the sensor 10. While a hydraulic shovel is operating, motion acceleration such as centrifugal force other than gravity should be imparted to force applied to each driven part of the construction machine 1. Since the incline sensor cannot detect gravity acceleration separately from other motion acceleration, the incline sensor should detect motion acceleration as resultant force between gravity acceleration and other motion acceleration. That is, the sensor 10 should measure an incline and an angle for each driven part in a resultant direction of gravity corresponding to resultant force between gravity acceleration and other motion acceleration, indicating appearance of an error (noise) as a difference in acceleration between the resultant direction of gravity and an actual direction of gravity. For this reason, it is possible to eliminate such an error (noise) by calculating a difference between motion acceleration, such as centrifugal force other than gravity acceleration, and acceleration in a direction of gravity. In the case of an incline sensor having a single axis, for example, it is possible to calculate an incline (or an angle) for each driven part via formula (1). In formula (1), a symbol θ represents an incline (or an angle) for each driven part; a symbol F represents gravity acceleration detected by an incline sensor; a symbol G represents gravity acceleration. Upon assuming an operating state of a hydraulic shovel, F should be a resultant force combining gravity acceleration and motion acceleration such as centrifugal force. In this connection, it is possible to transform formula (1) into formula (2) using F(G) as gravity acceleration and F(A) as other motion acceleration among various values of gravity acceleration detected by an incline sensor. It is possible to realize formula (3) upon finding F(G) as gravity acceleration from formula (2). Using F(G) as gravity acceleration determined in formula (2), it is possible to realize formula (4) upon finding an actual incline (or an angle θ') for each driven part.

[Math 1]

$$\theta = \arcsin(F/G) \tag{1}$$

[Math 2]

$$\theta = \arcsin((F(G)-F(A))/G)) \tag{2}$$

[Math 3]

$$F(G) = G \cdot \sin(\theta) + F(A) \tag{3}$$

[Math 4]

$$\theta' = \arcsin(F(C)/G) \tag{4}$$

Assuming other motion acceleration F(A) as centrifugal force, it is possible to calculate other motion acceleration F(A) via formula (5). Herein, a symbol m represents a mass of an incline sensor; a symbol ω represents angular speed of an inclination sensor; a symbol r represents a distance from an incline sensor to a rotation axis for each driven part; a symbol φ represents an angle calculated between centrifugal force and a reference direction of an incline sensor. In this connection, it is possible to calculate angular speed of an incline sensor according to the attitude information recently calculated by the attitude calculation unit 22.

[Math 5]

$$F(A) = m\omega^2 r \sin(\phi) \tag{5}$$

As to other motion acceleration F(A), it is possible to calculate a traveling distance per unit time in a detection direction of an incline sensor based on the recent attitude information as a variation of motion acceleration F(A). Alternatively, it is possible to produce motion acceleration F(A) according to motion of inertia and natural frequency.

Upon estimating noise characteristics, the noise-characteristic estimation unit 211 output the noise characteristics to the filtering adjustment unit 212. The processing of the noise-characteristic would be one aspect of processing for estimating noise characteristics based on analysis results about the status of a controlled machine (e.g., force of inertia, moment of inertia, natural frequency) which is calculated based on the status information. In this connection, the noise-characteristic estimation unit 211 may estimate noise characteristics using any one of the aforementioned processes individually with respect to multiple measurement data acquired from the sensors 10. In this case, the noise-characteristic estimation unit 211 may outputs to the filtering adjustment unit 212 the information relating to a combination of an identifier of the sensor 10 assigned to its measurement data and its corresponding noise characteristics.

Based on the estimated noise characteristics, the filtering adjustment unit 212 adjusts a formula of filtering to eliminate noise from measurement data to a filtering formula to appropriately eliminate noise from measurement data when the construction machine 1 maintains its current attitude or drives its specific part (step S108).

When a Kalman filter is used to perform a filtering process for noise elimination, for example, the filtering adjustment unit 212 may correct a variance $\sigma_v^2$ of system noise and a variance $\sigma_w^2$ of observation noise of a Kalman filter based on the estimated noise characteristics. Specifically, the filtering adjustment unit 212 should correct a variance $\sigma_v^2$ of system noise in a prior-error covariance matrix P⁻(k) based on the estimated noise characteristics in a prediction step according to formula (6). Alternatively, the filtering adjustment unit 212 should correct a variance $\sigma_w^2$ of observation noise in a Kalman gain based on the estimated noise characteristics in a filtering step according to formula (7).

[Math 6]

$$P(k)=A\cdot P(k-1)\cdot A^T+\sigma_v^2 b\cdot b^T \qquad (6)$$

[Math 7]

$$g(k)=P^-(k)\cdot c/\{c^T\cdot P^-(k)\cdot c+\sigma_w^2\} \qquad (7)$$

Instead of the process of step S108, the filtering adjustment unit 212 may change a filtering type based on the estimated noise characteristics. For example, the filtering adjustment unit 212 may select an appropriate filtering method suited to the estimated noise characteristics among multiple filtering methods such as a Kalman filter and an infinite impulse response (IIR) filter. The filtering adjustment unit 212 determines and outputs the filtering method to the filtering processing unit 213.

Using the filtering method, the filtering processing unit 213 performs a filtering process of noise superposed on measurement data acquired from the sensor(s) 10.

The exterior control device 2 may repeatedly perform a series of the aforementioned processes of steps S101 through S108. In this connection, the exterior control device 2 may successively or periodically repeat the aforementioned processes. For example, the exterior control device 2 may periodically perform the aforementioned processes according to a cycle of the sensor(s) 10 to output measurement data. Alternatively, the exterior control device 2 may starts the aforementioned processes from the process of step S101 at the timing to receive measurement data from the sensor 10.

Due to implementation of the aforementioned processes in step S101 through S108, the filtering device 21 can adjust filtering to appropriately eliminate noise superposed on measurement data according to the attitude and the driven status of the construction machine 1. As a result, the external control device 2 can eliminate noise (i.e., noise superposed on measurement data) which may be varied according to the attitude and the driven status of the construction machine 1 with high accuracy; hence, it is possible to improve precision of controlling the attitude and the driven status of the construction machine 1.

Second Exemplary Embodiment

Figure 5:
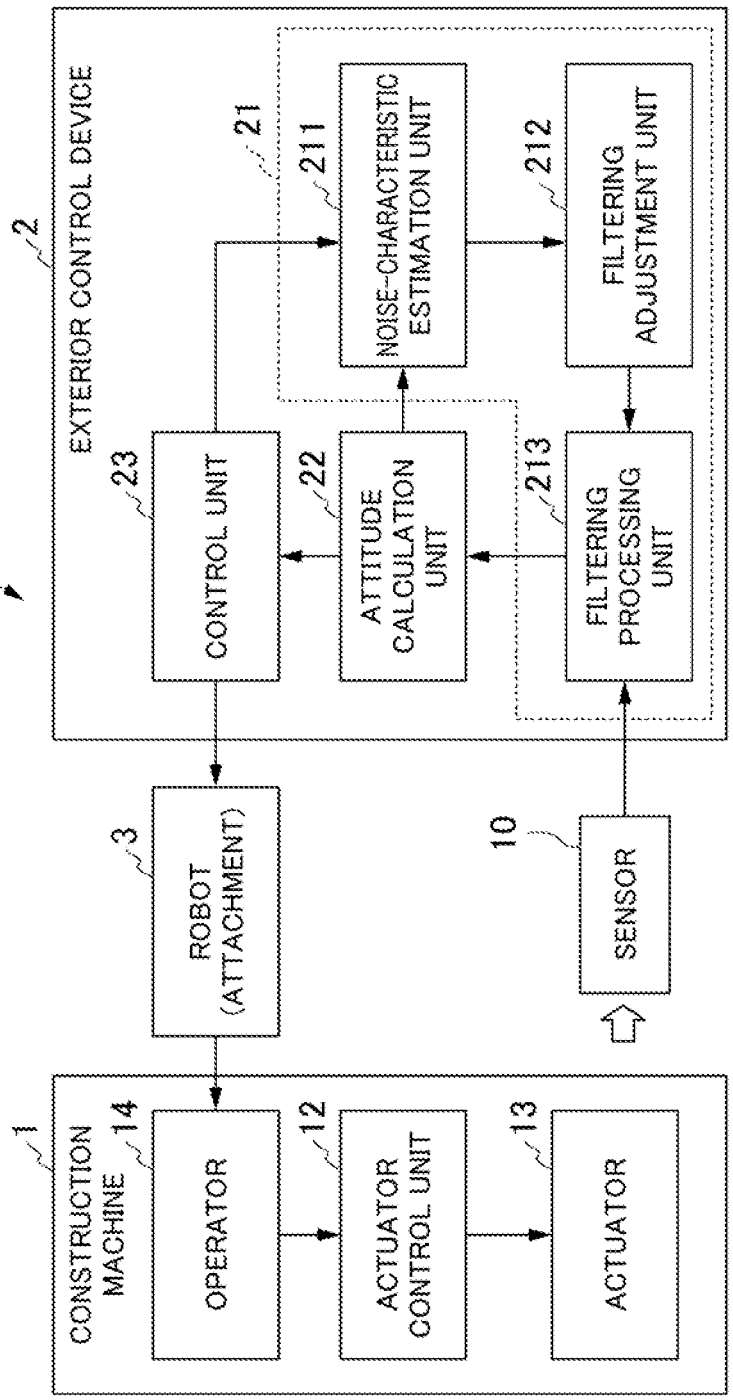
FIG. 5 is a block diagram showing the functionality of a control system according to the second exemplary embodiment.

FIG. 5 is a block diagram showing the functionality of the control system 100 according to the second exemplary embodiment.

The control system 100 of the second exemplary embodiment differs from the control system 100 of the first exemplary embodiment in that the exterior control device 2 outputs the drive control information to a robot 3 configured to operate the construction machine 1.

In this case, the construction machine 1 includes the actuator control unit 12 and the actuator 13 as well as an operator 14 such as an operation lever and an operation pedal. The robot (or an attachment) 3 is configured to operate the operator 14 of the construction machine 1 based on the drive control information of the construction machine 1 obtained from the exterior control device 2. In this case, the robot (or the attachment) 3 is located close to the operator 14 in order to operate the operator 14.

In the second exemplary embodiment, the operation of the exterior control device 2 is similar to that of the first exemplary embodiment. Based on the drive control information of the construction machine 1, the robot (or the attachment) 3 should operate the operator 14 of the construction machine 1 to achieve an operation of the actuator 13 according to the drive control information. The actuator control unit 12 acquires an output signal to be output due to an operation of the operator 14 so as to control the actuator based on the output signal. Accordingly, it is possible for the construction machine 1 to perform an operation based on the drive control information.

Third Exemplary Embodiment

Figure 6:
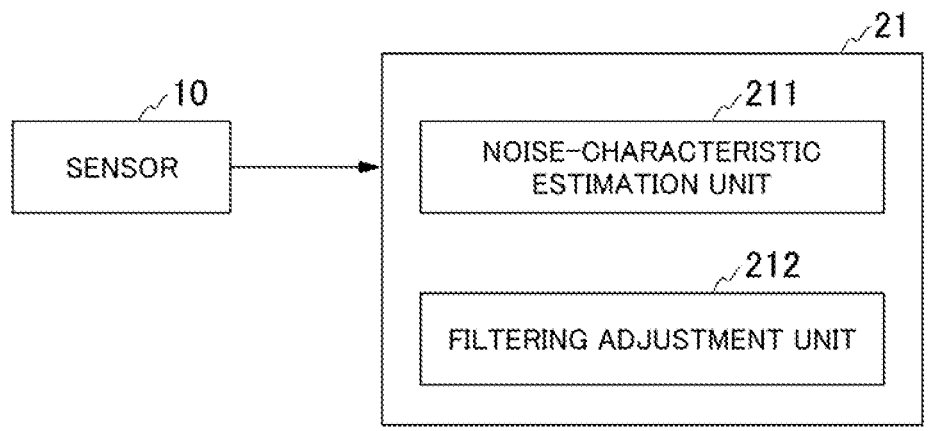
FIG. 6 is a block diagram showing the minimum configuration of a filtering device according to one exemplary embodiment of the present invention.

FIG. 6 is a block diagram showing a filtering system including a filtering device according to the third exemplary embodiment.

Figure 7:
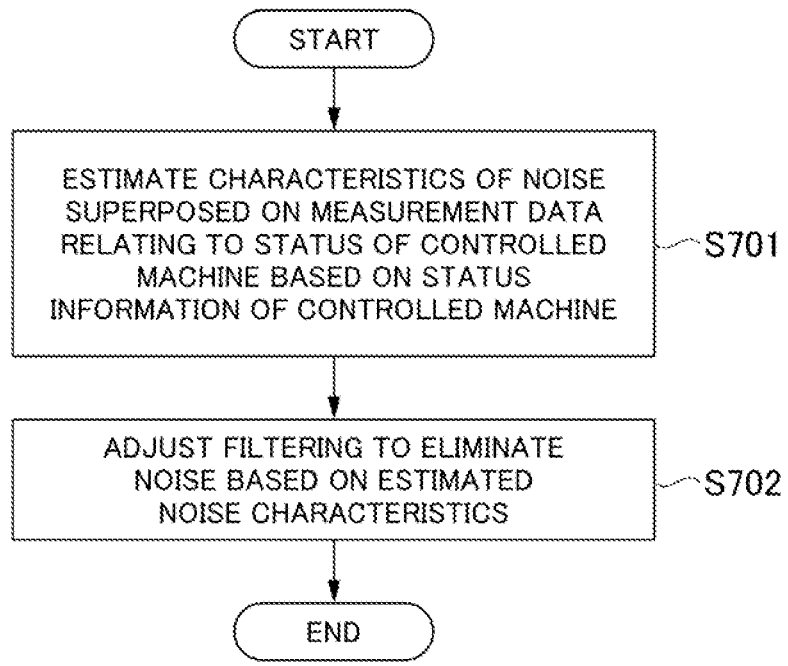
FIG. 7 is a flowchart showing the processing of the filtering device having the minimum configuration according to one exemplary embodiment of the present invention.

FIG. 7 is a flowchart showing the processing of the filtering device according to the third exemplary embodiment.

The filtering system includes the sensor 10 and the filtering device 21. The filtering device 21 includes at least the noise-characteristic estimation unit 211 and the filtering adjustment unit 212.

The sensor 10 is configured to acquire measurement data relating to the status of a controlled machine.

The noise-characteristic estimation unit 211 is configured to estimate characteristics of noise superposed on measurement data based on the status information representing the status of a controlled machine (step S701).

The filtering adjustment unit 212 is configured to adjust filtering to eliminate noise based on the estimated noise characteristics (step S702).

The aforementioned devices include computer systems therein. The aforementioned processes are stored on computer-readable storage media in the form of programs; hence, computer may read and execute programs to achieve the aforementioned processes. Herein, computer-readable storage media refer to magnetic disks, magneto-optical disks, CD-ROM, DVD-ROM, semiconductor memory, and the like. In addition, it is possible to deliver computer programs to computers, hence, computers may receive and execute programs delivered thereto.

The aforementioned programs may achieve some of the aforementioned functions. In addition, the aforementioned programs may be so-called differential files (or differential programs) which can be combined with pre-installed programs of computer systems to achieve the aforementioned functions.

Part or the entirety of the foregoing embodiments can be expressed as the following appendixes, however, which are not necessarily restrictive.

APPENDIX 1

A program causing a computer of a filtering device to implement functions as a noise-characteristic estimation means configured to estimate characteristics of noise superposed on measurement data relating to a status of a controlled machine based on status information representing the status of the controlled machine, and a filtering adjustment means configured to adjust filtering to eliminate the noise based on the estimated noise characteristics.

APPENDIX 2

The program according to Appendix 1, wherein the noise-characteristic estimation means estimates noise characteristics suited to a value of the status information according to an association between the value of the status information and the noise characteristics.

APPENDIX 3

The program according to Appendix 1, wherein the noise-characteristic estimation means estimates noise characteristics according to an analysis result about the status of the controlled machine which is calculated based on the value of the status information.

APPENDIX 4

The program according to any one of Appendix 1 through Appendix 3, wherein the filtering adjustment means adjusts a variance of a Kalman filter according to noise characteristic.

APPENDIX 5

The program according to any one of Appendix 1 through Appendix 3, wherein the filtering adjustment means adjusts a formula of filtering to a filtering formula to eliminate the noise according to noise characteristics, thus eliminating the noise according to the adjusted filtering formula.

APPENDIX 6

The program according to any one of Appendix 1 through Appendix 5, wherein the filtering adjustment means identifies a filtering formula suited to noise characteristics among a plurality of different filtering formulae, thus eliminating noise according to the identified filtering formula.

APPENDIX 7

The program according to any one of Appendix 1 through Appendix 6, wherein the status information includes at least one of attitude information representing the attitude of the controlled machine and drive control information representing an instruction to drive the controlled machine.

REFERENCE SIGNS LIST

1 . . . construction machine
2 . . . exterior control device
3 . . . robot
10 . . . sensor
21 . . . filtering device
22 . . . attitude calculation unit
23 . . . control unit
211 . . . noise-characteristic estimation unit
212 . . . filtering adjustment unit
213 . . . filtering processing unit

What is claimed is:
1. A filtering device comprising:
at least one memory storing instructions; and
at least one processor configured to execute the instructions to:
estimate noise characteristics of noise superposed on measurement data relating to a status of a controlled machine based on status information representing the status of the controlled machine, the status information including attitude information of the controlled machine and drive control information of the controlled machine; and
adjust filtering to eliminate the noise based on the estimated noise characteristics.

2. The filtering device according to claim 1, wherein the at least one processor is configured to execute the instructions to estimate the noise characteristics associated with a value of the status information, thereby according to an association between the value of the status information and the noise characteristics.

3. The filtering device according to claim 1, wherein the at least one processor is configured to execute the instructions to estimate the noise characteristics based on an analysis result of the status of the controlled machine which is calculated according to the value of the status information.

4. The filtering device according to claim 1, wherein the at least one processor is configured to execute the instructions to adjust a variance of a Kalman filter according to the noise characteristics.

5. The filtering device according to claim 1, wherein the at least one processor is configured to execute the instructions to adjust a filtering formula to eliminate the noise according to the noise characteristics, thus eliminating the noise according to the adjusted filtering formula.

6. The filtering device according to claim 1, wherein the at least one processor is configured to execute the instructions to identify a filtering formula suited to the noise characteristics among a plurality of different filtering formulas, thus eliminating the noise according to the identified filtering formula.

7. A control system comprising:
a sensor configured to acquire measurement data relating to a status of a controlled machine;
at least one memory storing instructions; and
at least one processor configured to execute the instructions to:
estimate noise characteristics of noise superposed on measurement data based on status information representing the status of the controlled machine, the status information including attitude information of the controlled machine and drive control information of the controlled machine; and
adjust filtering to eliminate the noise based on the estimated noise characteristics.

8. The control system according to claim 7, wherein the at least one processor is configured to execute the instructions to estimate the noise characteristics associated with a value of the status information, acquired thereby according to an association between the value of the status information and the noise characteristics.

9. The control system according to claim 7, wherein the at least one processor is configured to execute the instructions to estimate the noise characteristics based on an analysis result of the status of the controlled machine which is calculated according to the value of the status information.

10. The control system according to claim 7, wherein the at least one processor is configured to execute the instructions to adjust a variance of a Kalman filter according to the noise characteristics.

11. The control system according to claim 7, wherein the at least one processor is configured to execute the instructions to adjust a filtering formula to eliminate the noise according to the noise characteristics, thus eliminating the noise according to the adjusted filtering formula.

12. The control system according to claim 7, wherein the at least one processor is configured to execute the instructions to identify a filtering formula suited to the noise characteristics among a plurality of different filtering formulas, thus eliminating the noise according to the identified filtering formula.

13. A filtering method performed by a computer and comprising:
  estimating noise characteristics of noise superposed on measurement data relating to a status of a controlled machine based on status information representing the status of the controlled machine, the status information including attitude information of the controlled machine and drive control information of the controlled machine; and
  adjusting filtering to eliminate the noise based on the estimated noise characteristics.

14. The filtering method according to claim 13, wherein the noise characteristics associated with a value of the status information is estimated according to an association between the value of the status information and the noise characteristics.

15. The filtering method according to claim 13, wherein the noise characteristics are estimated based on an analysis result of the status of the controlled machine which is calculated according to the value of the status information.

16. The filtering method according to claim 13, wherein the filtering is adjusted to adjust a variance of a Kalman filter according to the noise characteristics.

17. The filtering method according to claim 13, wherein the filtering is adjusted to adjust a filtering formula to eliminate the noise according to the noise characteristics, thus eliminating the noise according to the adjusted filtering formula.

18. The filtering method according to claim 13, wherein the filtering is adjusted to identify a filtering formula suited to the noise characteristics among a plurality of different filtering formulas, thus eliminating the noise according to the identified filtering formula.

* * * * *